R. V. VILLIERS.
WATERPROOF BATTERY AND METHOD OF MAKING SAME.
APPLICATION FILED MAY 11, 1910.
1,027,088.
Patented May 21, 1912.
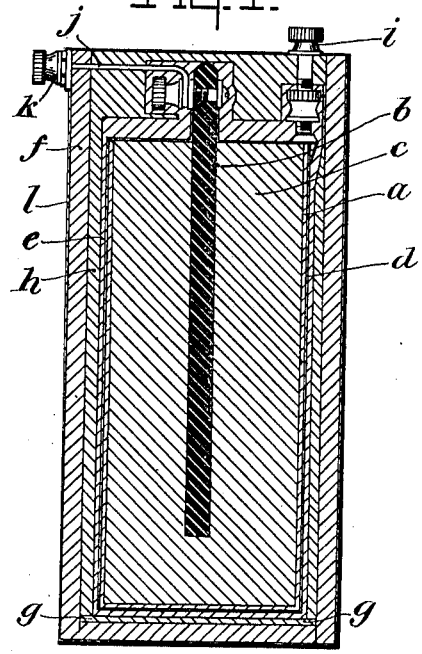
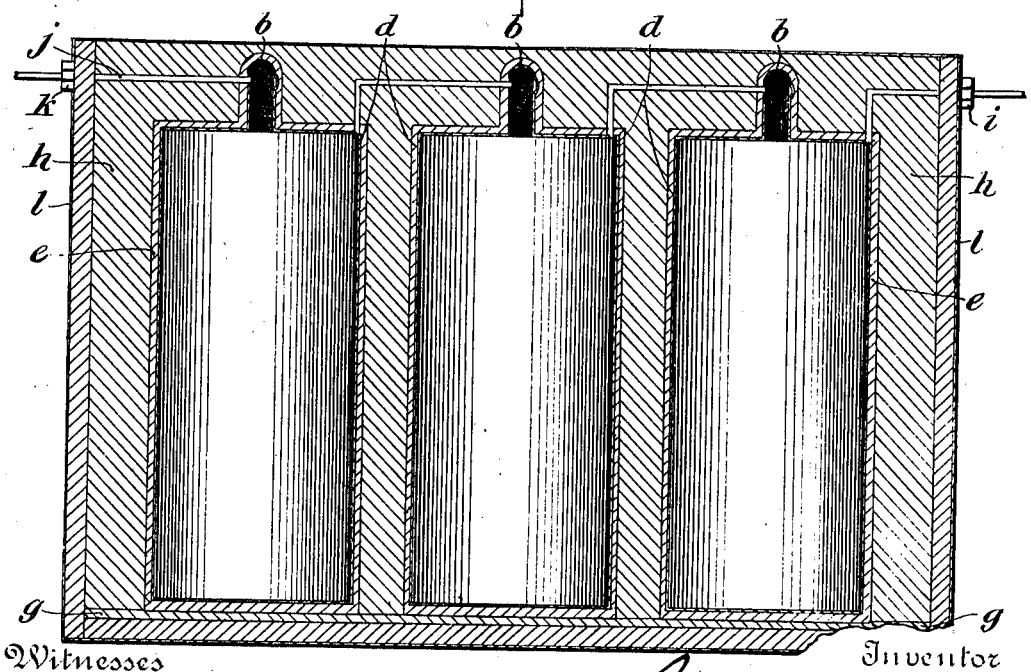
Witnesses
Donald H. Stewart.
Joseph C. Stack.
Inventor
Ralph V. Villiers
By Dowell & Dowell
his Attorneys

UNITED STATES PATENT OFFICE.

RALPH V. VILLIERS, OF EAST FREETOWN, MASSACHUSETTS.

WATERPROOF BATTERY AND METHOD OF MAKING SAME.

1,027,088.  Specification of Letters Patent.  Patented May 21, 1912.

Application filed May 11, 1910. Serial No. 560,679.

*To all whom it may concern:*

Be it known that I, RALPH V. VILLIERS, a citizen of Canada, residing at East Freetown, in the county of Bristol and State of Massachusetts, have invented certain new and useful Improvements in Waterproof Batteries and Methods of Making Same, of which the following is a specification.

The object of my invention is to provide a reliably waterproof electric battery, and one that may be used successfully under water. I accomplish this object by the following method: First, I provide a dry voltaic cell and apply thereto a laccic coating, preferably two coats of shellac, and when dry I apply a coat of paraffin or other substance adapted to seal the cell against moisture. Plaster of Paris may be used for this purpose, though paraffin or a similar wax-like substance is preferred. The cell thus coated, when the paraffin or plaster of Paris has become dry, is incased in a hard mastic composition which is an insulating material and which is adapted to withstand the effects of water. For this purpose, the cell is completely incased by the cement or other mastic composition, its carbon and zinc elements being extended through the mastic or connected to exterior binding posts or to binding posts set in the cement. For incasing the cell, it may be placed in a suitable mold and the cement filled in the mold around the cell, and allowed to set and harden, after which the mold may be separated and removed. As the cement sets, the paraffin envelop of the cell keeps moisture therefrom, and protects it from any water that might work through the cement. When completed, the device may be coated with shellac or paint; and the battery thus made is adapted to work under water.

In the case of a battery composed of a plurality of cells, connected in series, parallel, or multiple, as desired, the procedure is substantially the same, except that the several cells having each been enveloped in paraffin or other suitable sealing substance, as stated, are all completely incased in the cement or mastic composition, which separates the cells one from another and also incases the connections therebetween, while the carbon and zinc elements forming the terminal electrodes of the circuit may be extended through the cement or mastic composition or connected to exterior binding posts, as already explained.

Constructed as thus described, the battery will have the appearance of a cement block; but in some cases it may be preferable to employ a wooden box or container in place of the iron mold, and to retain said box as a permanent casing; in which event the exterior coating of shellac or paint would be applied to the outside of the box. For this construction, I provide a box of greater depth than the height of the cell, and apply in the bottom of said box a layer of cement which is allowed to stand until quite hard. Then the cell is set within the box, upon its cement bottom, and the box is filled with cement around and over the top of the cell; a wire being first run from the carbon element of the cell to a binding post provided on the outside of the box, while the zinc element extends through the cement filling and is also provided with a binding post. When the cement filling is hard, the whole structure is given one or more coats of shellac or paint, which completes the same.

In the accompanying drawings, which are to be taken as part of this specification, Figure 1 is a central vertical sectional view of a single cell battery, and Fig. 2 is a similar view of a multiple cell battery, embodying my invention; it being understood that the illustration is diagrammatic.

The batteries selected for illustrating my invention include the aforesaid wooden box or container which is employed as the mold for a cement or plastic filling and as a permanent case therefor.

$a$ indicates the zinc element, $b$ the carbon element, and $c$ the electrolyte of the cell.

$d$ is the shellac coating on the cell, and $e$ is the coat of paraffin.

$f$ is the wooden box or container, $g$ its bottom layer of cement, and $h$ the cement filling.

$i$ is the binding-post connected to the zinc element; and $j$ is the wire leading from the carbon element to the binding-post $k$ on the outside of the box.

$l$ is the exterior coat of shellac.

For a single cell having the dimensions of $2\frac{1}{4}$ inches by $6\frac{3}{4}$ inches, I use a box three inches square inside and $7\frac{1}{2}$ inches in depth, and apply the bottom cement layer ½ of an inch thick; but I do not confine myself to these dimensions.

A handle (not shown) may be arranged at the top of the box, which handle may be attached to the wooden box or container, or, if the cement is molded and no exterior case is employed, the handle may be attached to the cement by two bolts embedded in the cement, the bolts extending downward about three inches from the upper surface and having nuts or projections on their lower ends so as to hold when the cement is hard.

In the foregoing description and the following claims, the term "battery" is to be construed as including a single cell or a plurality of connected cells.

I claim as my invention, and desire to secure by Letters Patent:

1. The method of making a waterproof battery which consists in providing a dry cell with an envelop of paraffin or other sealing substance, and completely incasing the same in cement.

2. The method of making a waterproof battery which consists in providing a wooden box with a bottom layer of cement, providing a dry cell with a laccic coating and an exterior hermetically-sealing coating, setting said cell in said box and filling the latter with cement, and then applying a finishing laccic coating.

3. A waterproof battery comprising a box having a cement filling and a dry cell incased thereby and having a laccic coating and a coating of paraffin.

4. A battery having a laccic coating and a cementitious casing molded over said coating to completely envelop the battery.

5. A battery entirely incased in an integral envelop of cement.

6. The method of waterproofing a battery which consists in coating the entire outer surface of the battery with a laccic sealing substance, and then molding around the same, in intimate contact with the laccic coating, a cementitious envelop which will completely inclose the battery.

In testimony whereof I affix my signature, in presence of two witnesses.

RALPH V. VILLIERS.

Witnesses:
 JAMES P. DORAN,
 WILLIAM DONOVAN.